US008428987B2

(12) United States Patent
Najmi et al.

(10) Patent No.: US 8,428,987 B2
(45) Date of Patent: *Apr. 23, 2013

(54) DETERMINING ORDER LEAD TIME FOR A SUPPLY CHAIN USING A PROBABILITY DISTRIBUTION OF ORDER LEAD TIME

(75) Inventors: Adeel Najmi, Plano, TX (US); Aseem Kohli, Melrose, MA (US); Dharmaraj Veerappanaicker, Lexington, MA (US)

(73) Assignee: JDA Software Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,853

(22) Filed: May 9, 2011

(65) Prior Publication Data

US 2011/0208560 A1 Aug. 25, 2011

Related U.S. Application Data

(63) Continuation-in-part of application No. 10/836,042, filed on Apr. 29, 2004, now Pat. No. 7,941,331.

(60) Provisional application No. 60/470,068, filed on May 12, 2003.

(51) Int. Cl.
*G06Q 10/00* (2012.01)
(52) U.S. Cl.
USPC .......................................................... 705/7.11
(58) Field of Classification Search .................. 705/7.11
See application file for complete search history.

(56) References Cited

U.S. PATENT DOCUMENTS

| 5,946,662 | A | | 8/1999 | Ettl et al. |
| 5,953,707 | A | | 9/1999 | Huang et al. |
| 6,078,900 | A | | 6/2000 | Ettl et al. |
| 6,151,582 | A | * | 11/2000 | Huang et al. ...................... 705/8 |

(Continued)

FOREIGN PATENT DOCUMENTS

| TW | 476889 | 2/2002 |
| TW | 495690 | 7/2002 |

OTHER PUBLICATIONS

Keaton, Mark: "Using the Gamma Distribution to Model Demand When Lead Time is Random", Journal of Business Logistics, vol. 16, No. 1, 1995.*

(Continued)

*Primary Examiner* — Mark A Fleischer
(74) *Attorney, Agent, or Firm* — Jackson White, PC; Steven J. Laureanti (57) ABSTRACT

A system and method is disclosed for estimating demand of a supply chain including accessing a probability distribution of order lead time of the supply chain. The supply chain has nodes including a starting node and an ending node and a path from the starting node to the ending node. The probability distribution of order lead time describes ending node demand of the ending node versus order lead time. The path is divided into order lead time segments which are associated with the probability distribution of order lead time by associating each order lead time segment with an order lead time range of the probability distribution of order lead time. A demand percentage is estimated for each order lead time segment in accordance with the probability distribution of order lead time, such that each demand percentage describes a percentage of a total ending node demand of an order lead time segment.

36 Claims, 7 Drawing Sheets

U.S. PATENT DOCUMENTS

| | | | |
|---|---|---|---|
| 6,643,556 | B1 | 11/2003 | Morenz et al. |
| 6,785,680 | B1 * | 8/2004 | Cragun ............................ 707/10 |
| 7,035,815 | B1 * | 4/2006 | Henson ............................ 705/26 |
| 7,324,966 | B2 * | 1/2008 | Scheer ............................ 705/28 |
| 7,827,049 | B2 | 11/2010 | Dogan |
| 7,853,462 | B2 | 12/2010 | Dogan |

OTHER PUBLICATIONS

Caramanis, et al. "Supply Chain (SC) Production Planning with Dynamic Lead Time and Quality of Service Constraints", Proceedings of the 42nd IEEE Conference on Decision and Control Maui, Hawaii USA, Dec. 2003.*

So, et al. "Impact of supplier's lead time and forecast demand updating on retailer's order quantity variability in a two-level supply chain", Int. J. Production Economics 86 (2003) 169-179.*

Lu, et al. "Order Fill Rate, Leadtime Variability, and Advance Demand Information in an Assemble-to-Order System", Operations Research vol. 51, Issue 2 (Mar. 2003) pp. 292-308.*

Raghavan, et al. "Stochastic Models for Analysis of Supply Chain Networks", Proceedings of the American Control Conference Anchorage, AK May 8-10, 2002.*

Smith, Stephen A,, "Optimal Inventories for an (S-I, S) System With No Backorders" Management Science, vol. 23, No. 5, Copyright 1977, The Institute of Management Sciences, pp. 522-528.

Wolff, Ronald W., "Poisson Arrivals See Time Averages", Operations Research, vol. 30, No. 2, 1982 Operations Research Society of America, pp. 223-231.

Federgruen, AWI, et al., "An Efficient Algorithm for Computing Optimal (s, S) Policies", Operations Research, vol. 32, No. 6, 1984 Operations Research Society of America, pp. 1268-1285.

Svoronos, Antony, et al., "Evaluation of One-For-One Replenishment Policies for Multiechelon Inventory Systems" Management Science, vol. 37, No. 1, Copyright 1991, The Institute of Management Sciences, pp. 68-83.

"Improving Service and Market Share with Inventory Optimization; How to Improve both your top and bottom lines through superior inventory management", White Paper, i2 Technologies, Inc., Copyright 2003 i2 Technologies, Inc., 32 Pages.

Johansen, Soren Glud, "Base-stock policies for the lost sales inventory system with Poisson demand and Erlangian lead times", Department of Operations Research, University of Aarhus, Denmark, pp. 1-14.

Caramanis, et al. "Supply Chain (SC) Production Planning with Dynamic Lead Time and Quality of Service Constraints", Proceedings of the 42nd IEEE Conference and Decision and Control Maui USA, Dec. 2003.

So, et al., "Impact of supplier's lead time and forecast demand updating on retailer's order quantity variability in a two-level supply chain", Int. J. Production Economics 86 (2003) 169-179.

Lu, et al. "Order Fill Rate, Leadtime Variability, and Advance Demand Information in an Assemble-to-Order System", Operations Research vol. 51, Issue 2 (Mar. 2003) pp. 292-308.

* cited by examiner

FIG. 3

CRITICALITY MATRIX $M_{i...j}$

| SPEED i OF PARTS \ HUB AGREEMENT j | YES | NO |
|---|---|---|
| FAST | | |
| MEDIUM | | |
| SLOW | | |

DETERMINING ORDER LEAD TIME FOR A SUPPLY CHAIN USING A PROBABILITY DISTRIBUTION OF ORDER LEAD TIME

CROSS-REFERENCE TO RELATED APPLICATIONS

This application is a continuation-in-part (CIP) of U.S. patent application Ser. No. 10/836,042, filed on Apr. 29, 2004 and entitled "Determining Order Lead Time for a Supply Chain Using a Probability Distribution of Order Lead Time," now U.S. Pat. No. 7,941,331 which claims the benefit of U.S. Provisional Patent Application Ser. No. 60/470,068, filed May 12, 2003, and entitled "Strategic inventory optimization." U.S. Pat. No. 7,941,331 and U.S. Provisional Patent Application Ser. No. 60/470,068 are commonly assigned to the assignee of the present application. The disclosure of related U.S. Pat. No. 7,941,331 and U.S. Provisional Patent Application Ser. No. 60/470,068 are hereby incorporated by reference into the present disclosure as if fully set forth herein

BACKGROUND

1. Technical Field of the Invention

This invention relates generally to the field of supply chain analysis and more specifically to estimating demand for a supply chain according to order lead time.

2. Background of the Invention

A supply chain supplies a product to a customer, and may include nodes that store inventory such as parts needed to produce the product. A known technique for maintaining a proper amount of inventory at each node may involve setting a reorder point at which inventory is reordered. For example, a node may reorder parts when its inventory is less than twenty units. Known techniques for maintaining a proper amount of inventory at each node, however, may require storage of excess inventory at the nodes and result in additional inventory carrying costs. It is generally desirable to reduce excess inventory and associated inventory carrying costs.

SUMMARY OF THE INVENTION

In accordance with the present invention, disadvantages and problems associated with previous supply chain analysis techniques may be reduced or eliminated.

According to one embodiment, estimating demand of a supply chain includes accessing a probability distribution of order lead time of the supply chain. The supply chain has nodes including a starting node and an ending node and a path from the starting node to the ending node. The probability distribution of order lead time describes ending node demand of the ending node versus order lead time. The path is divided into order lead time segments, and the order lead time segments are associated with the probability distribution of order lead time by associating each order lead time segment with a corresponding order lead time range of the probability distribution of order lead time. A demand percentage is estimated for each order lead time segment in accordance with the probability distribution of order lead time in order to estimate demand for the supply chain. Each demand percentage describes a percentage of a total ending node demand associated with the corresponding order lead time segment.

Certain embodiments of the invention may provide one or more technical advantages. For example, demand may be redistributed from an ending node to upstream nodes of a supply chain according to a probability distribution of order lead time. Redistributing the demand to upstream nodes may allow for optimizing inventory at individual nodes, which may simplify the optimization. Inventory for the supply chain may be optimized for the redistributed demand. Optimizing inventory for redistributed demand may decrease the need to stock inventory at downstream nodes, which may minimize cost. Inventory may be optimized with respect to a probability distribution of order lead time for a customer. Taking into account the order lead time may improve continued performance, which may lead to increased market share.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is made to the following description, taken in conjunction with the accompanying drawings, in which.

DESCRIPTION OF EXAMPLE EMBODIMENTS

Figure 1:
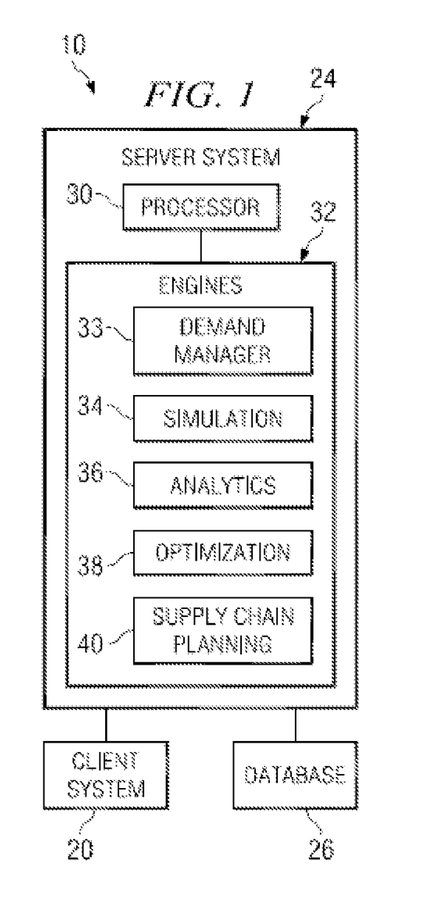
FIG. 1 is a block diagram illustrating an example system of optimizing inventory in a supply chain.

FIG. 1 is a block diagram illustrating an example system 10 of optimizing inventory in a supply chain that supplies products to customers in response to customer demand. For example, system 10 may optimize target safety stocks or other inventory measures, within a minimum overall target customer service level (CSL), at each node in the supply chain for each item flowing through the supply chain. According to one embodiment, system 10 may use assumptions to formulate a supply chain model, and evaluate the assumptions with respect to historical performance. According to another embodiment, products may be segmented into policy groups, such as criticality groups, for example, in order to determine customer service levels for the products. According to yet another embodiment, order lead times may be used to redistribute customer demand to upstream nodes of the supply chain.

According to the illustrated embodiment, system 10 includes a client system 20, a server system 24, and a database 26 coupled as shown in FIG. 1. Client system 20 allows a user to communicate with server system 24 to optimize inventory in a supply chain. Server system 24 manages applications for optimizing inventory in a supply chain. Database 26 stores data that may be used by server system 24.

According to the illustrated embodiment, server system 24 includes one or more processors 30 and one or more engines 32 coupled as shown in FIG. 1. Processors 30 manage the operation of server system 24, and may comprise any device operable to accept input, process the input according to predefined rules, and produce an output. According to one embodiment, processors 30 may comprise parallel processors in a distributed processing environment. Server system 24 may operate to decompose an optimization problem into a number of smaller problems to be handled by a number of processors 30. As an example, server system 24 may independently calculate the optimized inventory target for each of a number of nodes using a different processor 30.

According to the illustrated embodiment, engines 32 include a demand manager 33, a simulation engine 34, an analytics engine 36, an optimization engine 38, and a supply chain planning engine 40. Engines 32 may be configured in processors 30 in any suitable manner. As an example, engines 32 may be located in different processors 30. As another example, a backup for an engine 32 and the engine 32 itself may be located in different processors 30.

Demand manager 33 provides demand forecasting, demand planning, other demand management functionality, or any combination of the preceding. Simulation engine 34 simulates execution of a supply chain. Simulation engine 34 may be used to evaluate supply chain models. Analytics engine 36 analyzes inventory, demand, and order lead time data. Analytics engine 36 may be used to segment customers, items, locations, other entities, or any combination of the preceding into policy groups for different purposes. Optimization engine 38 optimizes the inventory at the nodes of a supply chain. Demand may be distributed to upstream nodes according to a demand forecast, and optimization engine 38 may optimize inventory for the distributed demand. Supply chain planning engine 40 generates a plan for a supply chain.

Client system 20 and server system 24 may each operate on one or more computers and may include appropriate input devices, output devices, mass storage media, processors, memory, or other components for receiving, processing, storing, and communicating information according to the operation of system 10. For example, the present invention contemplates the functions of both client system 20 and server system 24 being provided using a single computer system, such as a single personal computer. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device.

Client system 20, server system 24, and database 26 may be integrated or separated according to particular needs. If any combination of client system 20, server system 24, or database 26 are separated, they may be coupled to each other using a local area network (LAN), a metropolitan area network (MAN), a wide area network (WAN), a global computer network such as the Internet, or any other appropriate wire line, optical, wireless, or other link.

Modifications, additions, or omissions may be made to system 10 without departing from the scope of the invention. For example, system 10 may have more, fewer, or other modules. Moreover, the operations of system 10 may be performed by more, fewer, or other modules. For example, the operations of simulation engine 34 and optimization engine 38 may be performed by one module, or the operations of optimization engine 38 may be performed by more than one module. Additionally, functions may be performed using any suitable logic comprising software, hardware, other logic, or any suitable combination of the preceding. As used in this document, "each" refers to each member of a set or each member of a subset of a set.

Figure 2:
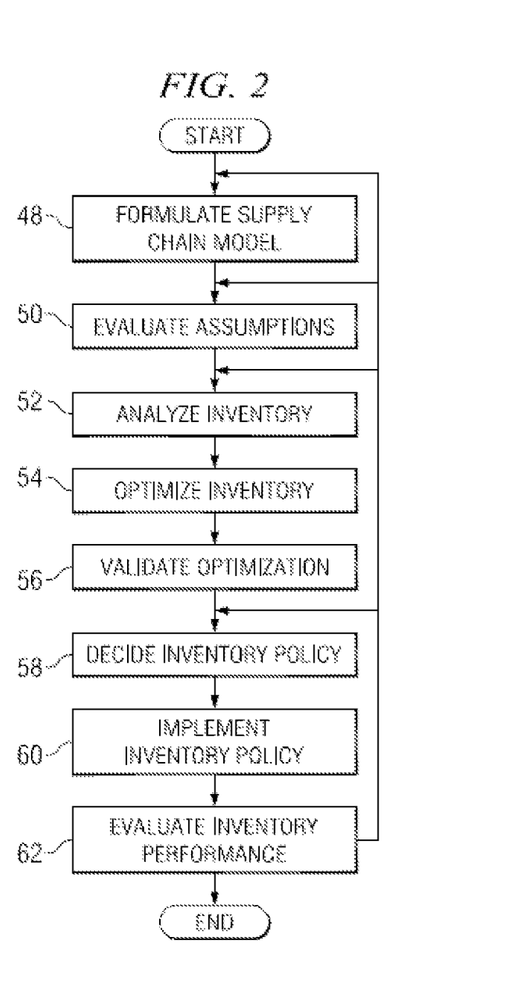
FIG. 2 is a flowchart illustrating an example method of optimizing inventory in a supply chain.

FIG. 2 is a flowchart illustrating an example method of optimizing inventory in a supply chain. The method may be used to separate the demand analysis from the supply analysis by redistributing the demand to upstream nodes and then calculating the inventory required to satisfy the redistributed demand. Separating the demand may provide for more efficient inventory analysis. The method begins at step 48, where a supply chain model is formulated for a supply chain. A supply chain model may be used to simulate the flow of items through the supply chain, and may represent one or more constraints of a supply chain. A constraint comprises a restriction of the supply chain. The supply chain model may have one or more assumptions. An assumption comprises an estimate of one or more parameters of a supply chain model.

The assumptions are evaluated at step 50. The assumptions may be evaluated by simulating the supply chain using the supply chain model and validating the simulation against historical data describing actual performance of the supply chain. Historical data describing a first time period may be applied to the supply chain model to generate a prediction describing a second time period. For example, given one year of data, the first ten months of data may be used with the supply chain model to predict the last two months of data. The prediction for the second time period may be compared to the historical data describing the second time period in order to evaluate the assumptions of the supply chain model. The assumptions may be adjusted in response to the evaluation.

The inventory is analyzed at step 52. The inventory may be analyzed by segmenting products into policy groups such as criticality groups. Each criticality group may correspond to a particular inventory policy such as a customer service level. Customer demand and order lead time may also be analyzed to determine demand and order lead time means and variability. The inventory is optimized at step 54 to determine an optimized inventory for each node of the supply chain. The sensitivity of the optimized inventory may be analyzed by adjusting the assumptions and checking the sensitivity of the inventory to the adjustment. According to one embodiment, the assumptions may be relaxed in order to reduce the complexity of the optimization.

The optimization may be validated at step 56. During validation, any assumptions that were relaxed during optimization may be tightened. An inventory policy may be determined at step 58. According to one embodiment, a user may decide upon an inventory policy in response to the validation results. The inventory policy is implemented in the physical supply chain at step 60.

The inventory performance may be evaluated at step 62 by determining whether the inventory performance satisfies inventory performance measures. In response to evaluating the inventory performance, the method may return to step 48 to formulate another supply chain model, to step 50 to re-evaluate the assumptions, to step 52 to re-analyze the inventory, or to step 58 to determine another inventory policy, or the method may terminate. According to one embodiment, an actual customer service level may be measured at a first time period. If the actual customer service level fails to satisfy the target customer service level, deviations between actual and assumed input values may be determined. The deviations may be determined according to defined workflows that are consistent and repeatable over successive time periods. An input value with a deviation may be identified to be a root cause of the failure and this information used as feedback for a subsequent time period. During the subsequent time period, the assumed value for the identified input may be adjusted and used to calculate a reoptimized inventory target. According to the embodiment, the steps of the method may be repeated in an iterative closed-loop process that is consistent and repeatable over successive time periods. The iterative closed-loop process may use the assumed values of the inputs as its inputs and the actual customer service level as its output.

Modifications, additions, or omissions may be made to the method without departing from the scope of the invention. For example, the step of evaluating the assumptions may be omitted. Additionally, steps may be performed in any suitable order without departing from the scope of the invention. For example, the step of evaluating the assumptions may be performed after the step of analyzing inventory. Furthermore, although the method is described as optimizing inventory for each node of the supply chain, the method may be used to optimize inventory for a subset of one or more nodes of the supply chain.

Figure 3:
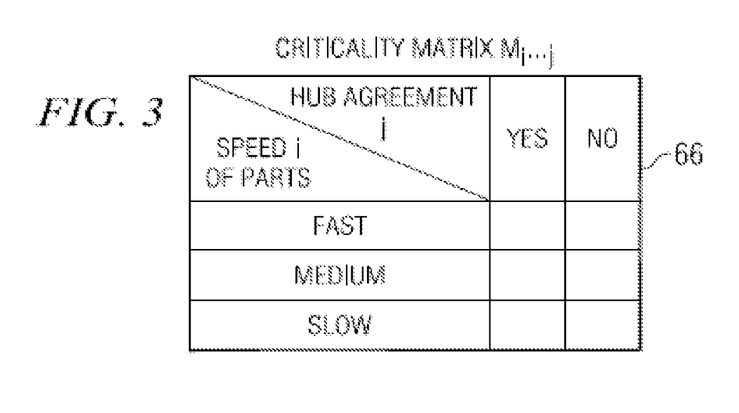
FIG. 3 illustrates an example matrix that may be used to generate criticality groups.

FIG. 3 illustrates an example matrix $M_i \ldots j$ 66 that may be used to generate policy groups such as criticality groups. A policy group comprises a set of entities strategically segmented for a particular purpose. An entity may comprise, for example, a product, a location, or a customer of a supply chain. According to one embodiment, a policy group may refer to a criticality group for which a service level policy is defined. A service level policy describes the level of service for an entity, and may include a customer service level, a lead time, or other parameter. As an example, segmentation may classify customers into criticality groups, where each criticality group has a specified customer service level. Criticality groups may be used to define different service levels for different customers. According to another embodiment, another policy group may refer to a set of entities that exhibit common buying behaviors, for example, common order lead time profiles.

According to the illustrated example, matrix $M_{i \ldots j}$ 66 is used to segment products into criticality groups, where each entry, or cell, $m_{i \ldots j}$ represents a criticality group with a specific service level policy. Matrix $M_{i \ldots j}$ 66 may have any suitable number of indices $i \ldots j$, where each index represents an attribute of the entities. An attribute comprises a feature of an entity that is relevant to the service level associated with the entity, and may be quantitative or non-quantitative. Examples of quantitative attributes include inventory volume, revenue calculated as volume times price, margin volume calculated as price minus cost, or other attributes. Examples of non-quantitative attributes may include product tier or life cycle, number of customers served, or other attributes. According to the illustrated example, index i represents the relative speed with which items for the product move through the supply chain, and j represents whether there is a hub agreement with the nodes through which the items flow. An index may, however, represent any suitable attribute. As an example, an index may be used to define target customer service levels, minimum offered lead times, maximum offered lead times, or any combination of the preceding for each criticality group. Each criticality group may represent a unique combination of item, location, and channel.

As used herein, the term "matrix" is meant to encompass any suitable arrangement of attributes in which each attribute associated with the matrix corresponds to at least one index of the matrix and may correspond to any number of indexes of the matrix. Such a matrix may have any suitable format. As an example, different cells may have different indices. As another example, policy groups corresponding to different cells may overlap. Membership to overlapping policy groups may be resolved by, for example, assigning priorities to the policy groups. An attribute not corresponding to any index of the matrix may be assigned to a default policy group.

Figure 4:
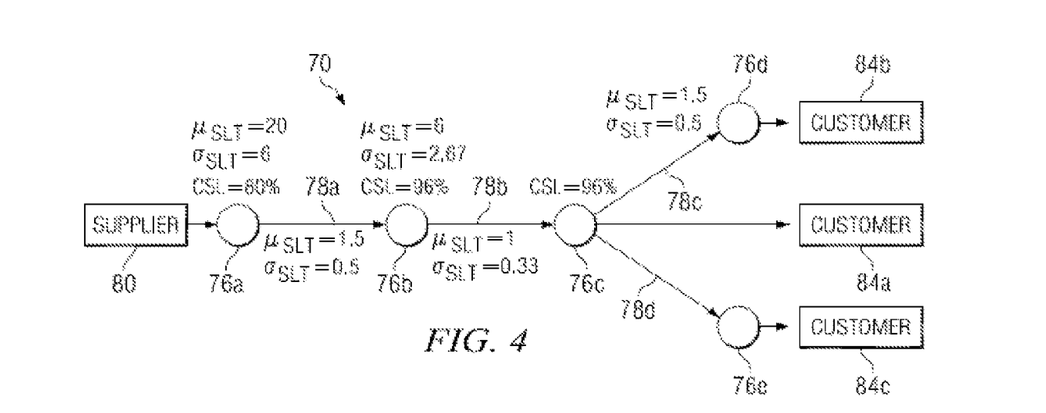
FIG. 4 is a diagram illustrating an example supply chain that receives supplies from one or more suppliers and provides products to one or more customers.

FIG. 4 is a diagram illustrating an example supply chain 70 that receives supplies from one or more suppliers 80 and provides products to one or more customers 84. Items flow through supply chain 70, and may be transformed or remain the same as they flow through supply chain 70. Items may comprise, for example, parts, supplies, or services that may be used to generate the products. The products may include none, some, or all of some or all of the items. For example, an item may comprise a part of the product, or an item may comprise a supply that is used to manufacture the product, but does not become a part of the product. Downstream refers to the direction from suppliers 80 to customers 84, and upstream refers to the direction from customers 84 to suppliers 80.

Supply chain 70 may include any suitable number of nodes 76 and any suitable number of arcs 78 configured in any suitable manner. According to the illustrated embodiment, supply chain 70 includes nodes 76 and arcs 78. Items from supplier 80 flow to node 76a, which sends items to node 76b. Node 76b sends items to node 76c, which sends items to customer 84a and nodes 76d and 76e. Nodes 76d and 76e provide products to customers 84b and 84c, respectively.

Node 76a may comprise one of one or more starting nodes 76a upstream from one or more ending nodes 76d-e. Starting nodes 76a may receive items directly from supplier 80 or from an upstream node 76, and ending nodes 76c-e may send items directly to a customer 84a-c or to a downstream node 76. A starting node 76a and an ending node 76c-e may define a path that includes starting node 76a, ending node 76c-e, and any intermediate nodes 76b-c between starting node 76a and an ending node 76c-e.

Although supply chain 70 is illustrated as having five nodes 76a-e and four arcs 78a-d, modifications, additions, or omissions may be made to supply chain 70 without departing from the scope of the invention. For example, supply chain 70 may have more or fewer nodes 76 or arcs 78. Moreover, nodes 76 or arcs 78 may have any suitable configuration. For example, node 76a may supply items to node 76c, but not to node 76b. As another example, any node 76 may supply items directly to a customer 84.

The products may be delivered to a customer 84 according to an order lead time or a demand lead time for customer 84. An order or demand lead time represents the time period during which supply chain 70 may satisfy an order. That is, an order or demand lead time is the time between when an order or demand is placed and when it needs to be served or when the demand is fulfilled. For example, if an airline ticket is purchased for a trip that will take place in 4 days, then the order lead time is 4 days. The airline knows the demand 4 days ahead of time. It is noted that the order or demand lead time is different from the typical supply lead time, which is the time it takes for a supplier to replenish a product.

The order or demand lead time for customer 84 may be calculated as the time between the time when the order or demand is finalized and the time when the order is to be provided to customer 84. The time when an order is finalized may be different from the time when the order was placed, since the order may be modified before the order is finalized. A finalized order may refer to an order at any suitable stage of the supply chain process. For example, finalized orders may refer to last changed orders, orders that have been shipped, orders that are in backlog, other suitable orders, or any combination of the preceding.

The order lead time for customer 84 may be described using a probability distribution of order lead time. A probability distribution of order lead time describes the probability distribution of demand relative to order lead time. That is, a cumulative probability distribution of order lead times is estimated by computing the cumulative percentage of order or demand volume against order or demand lead times. A probability distribution of order lead time may be calculated from an order lead time profile. An order lead time profile describes demand with respect to order lead time, and may be generated from a demand profile that describes demand with respect to time. The demand may be expressed as unit demand, as a proportion of the demand, or in any other suitable manner. As an example, an order lead time profile may describe a cumulative percentage of the demand with respect to order lead time. For example, an order lead time profile may have a y axis representing the cumulative percentage of demand and an x axis representing order lead time expressed as number of days. An example order lead time profiles (i.e., a cumulative probably function of order lead time) is described in more detail with reference to FIG. 6.

Although the probability distribution of order lead time may be calculated from an order lead time profile, the probability distribution may be determined from other suitable types of information using any suitable number of parameters. For example, the probability distribution may be determined from the absolute demand volume with respect to time. As another example, the probability distribution may be determined using a fuzzy logic approach. A fuzzy logic approach may, for example, designate that a certain amount or portion of the demand has a specific order lead time.

All of the demand typically does not have the same order lead time. That is, the order lead time may vary for each order, such that, some orders may be placed well in advance, while other orders may be placed at the last minute. For example, 70% of the demand may have an order lead time of less than 20 days, and 30% of the demand may have an order lead time of 20 days or greater. If a node 76 can replenish its inventory in time to satisfy a portion of the demand, node 76 does not need to stock the inventory for that portion of the demand. For example, if node 76 can replenish its inventory in less than 20 days to satisfy 30% of the demand, node 76 does not need to stock inventory for 30% of the demand.

According to one embodiment, the demand initiated by a customer 84 may be redistributed from a downstream node 76 to one or more upstream nodes 76. For example, the demand initiated by customer 84a, 84b, or 84c may be redistributed from downstream node 76c, 76d, or 76e, respectively, to one or more upstream nodes 76a-c. Optimization of the redistributed demand may be postponed to upstream nodes 76a-c. Redistributing demand upstream may serve to optimize supply chain 70. Typically, maintaining items at upstream nodes 76 is less expensive than maintaining items at downstream nodes 76. Additionally, more developed items at downstream nodes 76 are typically more susceptible to market changes. A method of optimizing inventory by redistributing demand to upstream nodes 76 is described in more detail with reference to FIG. 5.

According to one embodiment, redistributing the demand upstream involves taking into account the time it takes for supplies needed at nodes 76 to be replenished and the reliability of the supply nodes 76. The replenishment time may be determined from supply lead times (SLTs). According to the illustrated example, the mean supply lead time ($\mu_{SLT}$) for node 76a is 20.0 days with a variability ($s_{SLT}$) of 6.0 days, the mean supply lead time for arc 78a is 1.5 days with a variability of 0.5 days, the mean supply lead time for node 76b is 6.0 days with a variability of 2.67 days, the mean supply lead time for node 76c is 0.0 days with a variability of 0.00 days, the mean supply lead time for arc 78b is 1.0 day with a variability of 0.33 days, and the mean supply lead time for arc 78c is 1.5 days with a variability of 0.5 days. Node 76c may be considered a global distribution node. The reliability of the supply nodes 76 may be determined from the customer service levels of nodes 76. According to the illustrated example, the customer service level for node 76a is 80%, and the customer service levels for nodes 76b and 76c are 96%.

Figure 5:
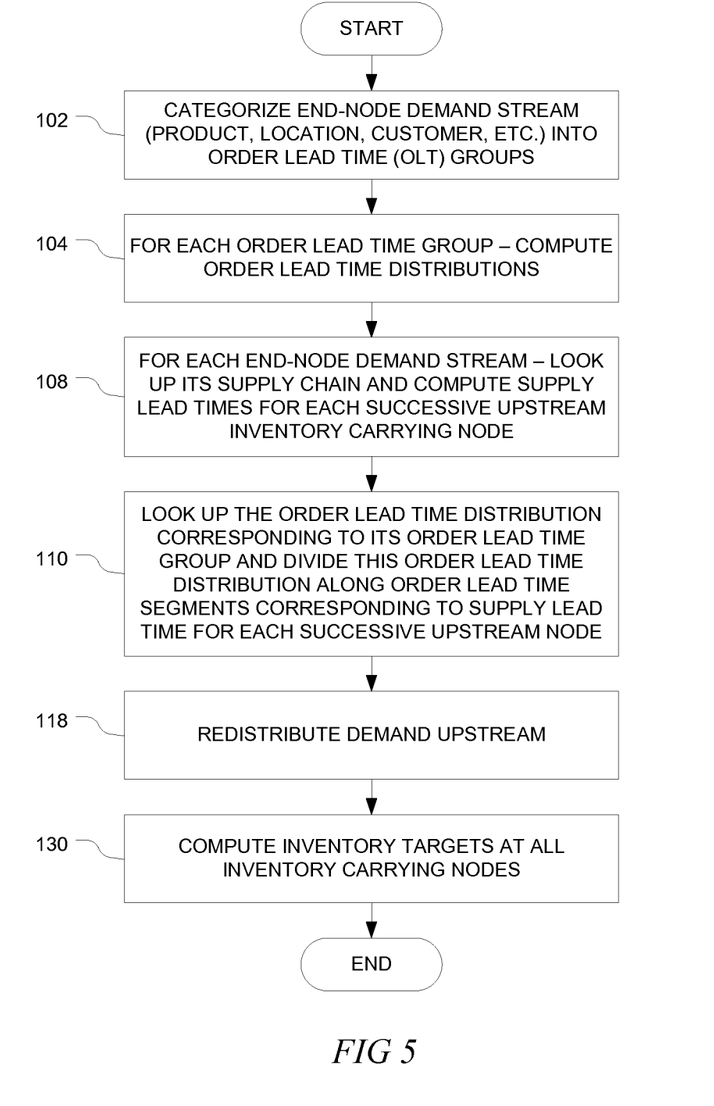
FIG. 5 is a flowchart illustrating an example method of inventory optimization.

FIG. 5 is a flowchart illustrating an example method of inventory optimization using order lead time distributions. In one embodiment, order lead time or demand lead time is the time between when an order or demand is placed and when it needs to be served. As a non-limiting example and as discussed above, if an airline ticket is purchased for a trip that will take place in 4 days, then the order lead time is 4 days. The airline knows the demand 4 days ahead of time. As used herein, order or demand lead time is different from supply lead time, which is the time it takes for a supplier to replenish a product. Order lead time may vary for each order, such that, some orders may be placed well in advance, while other orders may be placed at the last minute. An order lead time distribution is a probability distribution across the range of all possible order lead times. Note that order lead time distribution is a distinct notion from the notion of probability distribution of demand which represents the magnitude of the demand during a particular time and not how far in advance that demand was known.

The method begins at step 102, with a portfolio of ending node demand streams. Ending nodes 76 (for example, nodes 76d and 76e) are defined as nodes in the supply chain that service independent demands (i.e. directly serving customers 84). An ending node demand stream is a time series of demands at an ending node forecasted over one or more time periods. The time periods may not need to be equal in length. In one embodiment an ending node demand stream is identified by a unique combination product being sold, location from where the product is being shipped from and customer or customer location to whom the product is being sold to.

Continuing with step 102, customers, products, locations, other entity, or any combination of the preceding may be organized into groups for characterizing order lead time. For example, customers 84 may be categorized according to features that affect the order lead times of customers 84, such as demand requirements that customers 84 are required to satisfy, order lead times for the customer's industry, or other features. These features may be identified using a lead time history. As another example, product shipment size may be used to categorize products, or channel efficiency may be used to categorize channels.

Figure 6A:
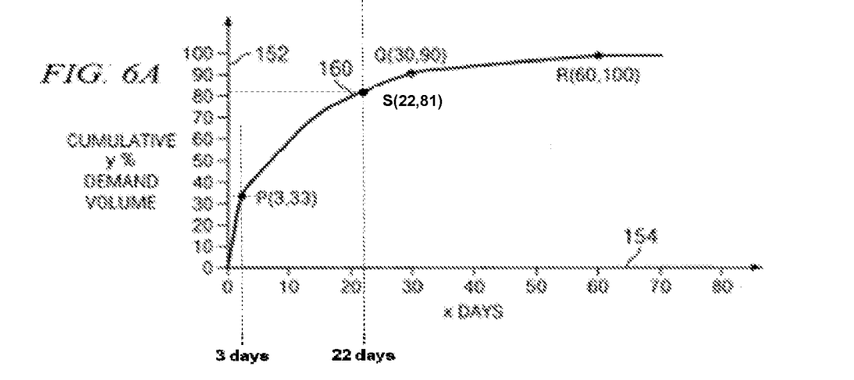
FIGS. 6A through 6C illustrate example order lead time profiles.

At step 104, discrete probability distributions are computed to represent the distribution of order lead times within each order lead time group. An example order lead time distribution is described in more detail with reference to FIG. 6A. As described below, FIG. 6A is the cumulative probability density function of order lead time, also referred to as the order lead time profile. For example, as shown in FIG. 6A a point Q indicates that 90% of the demand volume comes within 30 days or less of order lead time. Another way to read the same point Q is that 10% of the demand volume will come with at least 30 days of advance notice.

An order lead time profile may be determined by identifying the category to which a specific customer 84 belongs, and selecting the order lead time profile that corresponds to the identified category from the order lead time profile options. According to one embodiment, the lead time profile for a specific order lead time group may be modified to customize the order lead time profile. As an example, the order lead time profile may be modified by a user using a user interface to account for a predicted change in customer demand. The predicted change may result from, for example, item shortages, profit increase, economic downturn, or other economic factor. As another example, the order lead time profile may be modified to account for a maximum offered lead time or a minimum offered lead time.

As discussed below, steps 108, 110, and 118 are performed for each end node demand stream. At step 108, each distinct supply path is looked up for the end node. For each path the cumulative supply lead time is listed out, with a specified confidence level from each upstream inventory carrying node to the end node. As an example only and not by way of limitation and with reference to FIG. 4, nodes 76a, 76c, 76d and 76e are inventory carrying nodes and node 76b is designated as a non-inventory carrying or "flow-through" node.

In this example, the supply lead time (SLT) for each order lead time segment is calculated at step 108. According to one embodiment, the supply lead time SLT for an order lead time segment may be calculated according to $SLT = \mu + x\sigma$ for y % certainty. Values x and y may be determined according to standard confidence levels when SLT is represented as a normal distribution with a mean of $\mu$ and standard deviation of $\sigma$. For example, x=3 for y=99. According to the example supply chain 70 of FIG. 4, for 99% certainty, the supply lead time for arc 78c is 1.5+3(0.5)=3.0 days. Similarly, for 99% certainty, the supply lead time for arc 78b is 2.0 days, and the supply lead time for arc 78a is 3.0 days. The supply lead time, however, may be calculated according to any suitable formula having any suitable parameters. For example, the supply lead time SLT may be calculated according to $SLT = p_1 + p_2$, where $p_1$ represents a minimum delay, and $p_2$ represents an additional delay. Both $p_1$ and $p_2$ may be represented with their own probability distributions. Moreover, the supply lead times may have any suitable relationship with each other. For example, at least two of the supply lead times may overlap. Furthermore, the supply lead times may be adjusted in any suitable manner. For example, a one day padding may be added to one or more supply lead times.

In this example, and assuming supply lead times of 99% confidence is desired, supply chain 70 computes the supply lead time as $\mu + 3\sigma$ for each step of the supply path. The cumulative supply lead times are shown in TABLE 1:

TABLE 1

| Inventory carrying node | List of Arches and nodes with SLT specified making up supply path to end node 76d | Supply Lead Time with 99.9% confidence from inventory carrying node to end node 76d |
|---|---|---|
| 76d | none | 0 |
| 76c | 78c | 1.5 + 3 × 0.5 = 3 |
| 76a | 78c, 78b, 76b, 78a | [1.5 + 3 × 0.5] + [1 + 3 × 0.33] + [6 + 3 × 2.67] + [1.5 + 3 × 0.5] = 22 |

Supply chain 70 divides the order lead time distribution for the end node into order lead time segments (OLTSs) corresponding to each supply lead time, at step 110. An order lead time segment represents a portion of the path of supply chain 70 that may be used to distribute order lead times and demand upstream. Cycle times may be used to establish the order lead time segments. A cycle time for a node 76 or arc 78 represents the difference between the time when an item arrives at the node 76 or arc 78 and the time when the item leaves the node 76 or arc 78. For example, the cycle time for a node 76 may include a manufacturing, production, processing, or other cycle time. The cycle time for an arc 78 may include a distribution, transportation, or other cycle time. A cumulative cycle time for a node 76 represents the difference between the time when an item arrives at the node 76 and the time when the end product is delivered to customer 84. A cumulative cycle time may include the sum of one or more individual cycle times involved, for example, the cycle times for one or more nodes 76 and one or more arcs 78 involved. As an example, an order lead time segment may represent the difference between the cumulative cycle times for a first node 76 and an adjacent second node 76. Examples of order lead time segments are described with reference to FIG. 7.

Assuming that the order lead time distribution for the order lead time group to which end node 76d belongs is characterized by FIG. 6A, supply chain 70 computes order lead time segments in the following example. In this example, the supply lead time from node 76c to node 76d is 3 days. Order Lead Time distribution at a point P indicates that there is a 33% probability that orders will come with order lead time of 3 days or less. This is same as saying that 33% demand volume comes with 3 days or less of order lead time. Continuing with this example, the supply lead time from node 76a to node 76d is 22 days. Order Lead Time distribution at a point S indicates that there is a 81% probability that orders will come with lead time of 22 days or less. Combining this with the information for node 76c there is a 48% probability that orders will come in with lead times greater than 3 days but less than 22 days, as shown in TABLE 2:

TABLE 2

| Inventory carrying node | Supply path to end node 76d | Order Lead Time Segment | Order Lead Time Range | Difference | Demand % |
|---|---|---|---|---|---|
| 76d | none | OLT 1 | =3 days | 33-0 | 33% |
| 76c | 78c | OLT 2 | >3 days but = 22 days | 81-33 | 48% |
| 76a | 78c, 78b, 76b, 78a | OLT 3 | >22 days | 100-81 | 19% |

Once demand percentage splits along order lead time segments have been obtained as shown in TABLE 2, supply chain 70 redistributes demand for the purpose of inventory targets calculation. That is, if only 33% of the total demand at end node 76d comes with an order lead time of 3 days or less the safety stock needed at 76d needs to guard against only demand variability for 33% of the total demand. The remaining 67% of demand will arrive with sufficient lead time that it can be sourced from upstream inventory carrying nodes. This results in the ability to postpone safety stocks to upstream nodes.

Demand is redistributed to upstream order lead time segments at step 118 in order to postpone safety stock inventory to upstream nodes 76. Demand may be redistributed by estimating demand percentages for the order lead time segments. A demand percentage for an order lead time segment represents the percentage of the demand that needs to be satisfied during the order lead time segment in order to satisfy the customer demand within the constraints of the order lead time profile. An example of calculating demand percentages is described with reference to FIGS. 8 and 9.

Inventory that satisfies the demand percentages is established at nodes 76 at step 120. By calculating a demand percentage for each order lead time segment, the inventory for the redistributed demand may be determined by postponing safety stock inventory at each node 76. The inventory may be determined by calculating the inventory required at ending nodes 76 (for example, nodes 76d and 76e) to satisfy the demand percentage of ending nodes 76. The calculated inventory generates a demand for a first upstream node 76 (for example, node 76c). The inventory at the first upstream node 76 is determined to generate a demand for a second upstream node 76 (for example, node 76c), and so on. Inventory needed to satisfy the redistributed demand may be combined with inventory needed without regard to the redistributed demand in order to determine the total demand needed at a node 76. A method for establishing the inventory is described in more detail with reference to FIGS. 10 through 13.

Modifications, additions, or omissions may be made to the method without departing from the scope of the invention. For example, order lead time profiles need not be created for different categories at step 102. Instead, an order lead time profile for the specific customer 84 may simply be retrieved. Additionally, steps may be performed in any suitable order without departing from the scope of the invention.

Figure 6B:
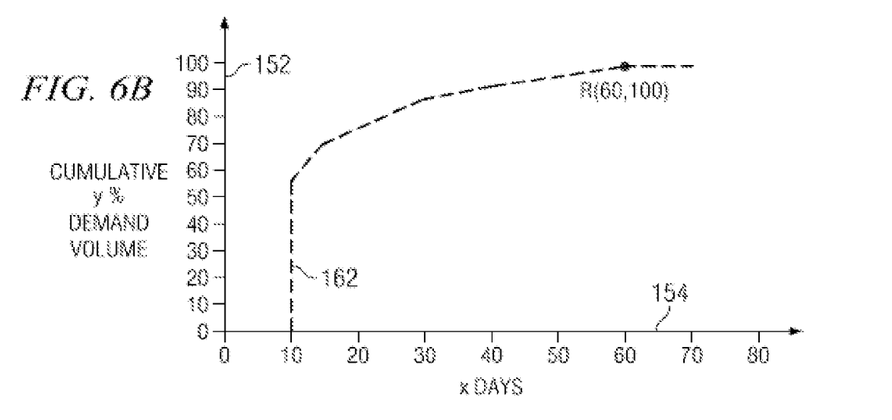
Figure 6C:
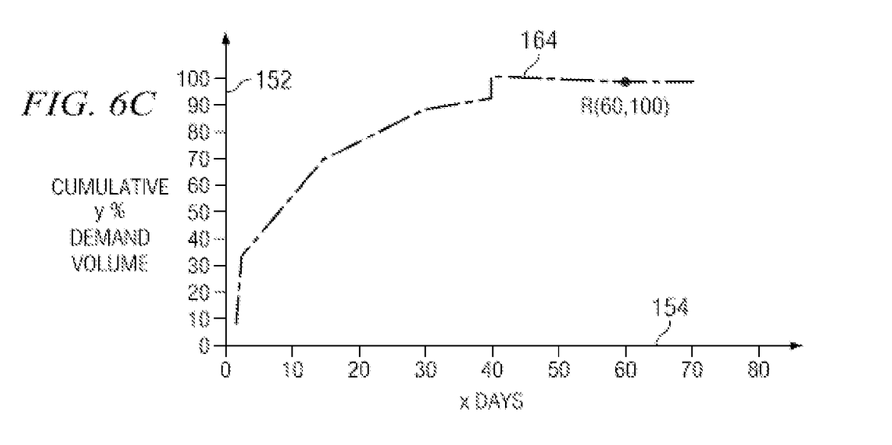

FIGS. 6A through 6C illustrate example order lead time profiles. An order lead time profile describes a demand corresponding to a node 76 such as an ending node 76 (for example, node 76d or 76e). For example, an order lead time profile may describe demand associated with customer 84a of FIG. 4. The customer demand is placed on ending node 76d to fulfill. In the illustrated embodiment, the order lead time profile is unconstrained (that is, assumes unlimited supply). Although the example order lead time profiles are illustrated as graphs, the information of the order lead time profiles may be presented in any suitable manner, for example, in a table.

FIG. 6A illustrates an example order lead time profile. According to the illustrated embodiment, a y axis 152 represents the cumulative percentage of demand volume, and an x axis 154 represents the order lead time expressed in days. According to one embodiment, a curve 160 represents an example of an order lead time profile that describes the cumulative percentage of demand volume having a certain order lead time. Accordingly, a point (x, y) of curve 160 represents that cumulative percentage y of the demand volume has an order lead time of x days. For example, a point P indicates that 33% of the demand volume has an order lead demand time of less than 3 days, a point S indicates that 81% of the demand volume has an order lead demand time of less than 22 days, a point Q indicates that 90% of the demand volume has an order lead time of 30 days, and a point R indicates that 100% of the demand volume has an order lead time of less than 60 days.

In one embodiment, order lead time profiles may be generated for different group levels, for example, for all orders, all items, all locations, or other group level. Generating order lead time profiles at the group level may result in generating fewer profiles, which may be easier to manage. Moreover, a user may be able to select a profile based upon the group level of interest. In another embodiment, multiple order lead time profiles may be generated for a group level. For example, an order lead time profile may be generated for each item. Generating multiple order lead time profiles may allow for fine-tuned demand monitoring. For example, where an order lead time profile is generated for each item, the order lead time profile for each item may be automatically monitored for changes that may impact optimal inventory target levels.

FIGS. 6B and 6C illustrate example order lead time profiles customized to account for maximum and minimum offered lead times, respectively. An order lead time profile may be customized using system 10. Past performance is not necessarily a good indicator of future performance. System 10 gives the user an opportunity to override or modify an order lead time profile using client system 10. An order lead time profile may be customized to account for maximum and minimum offered lead times. A user may want to impose a minimum offered lead time on an order lead time profile. An order lead time profile may be modified to reflect a minimum offered lead time by shifting the demand that is less than the minimum offered lead time to the minimum offered lead time. Moreover, a user may want to impose a maximum offered lead time on an order lead time profile. An order lead time profile may be modified to reflect a maximum offered lead time by shifting the demand that is greater than the maximum offered lead time to the maximum offered lead time.

In the illustrated example, curve 160 has been modified to take into account a minimum offered lead time and a maximum offered lead time to yield curves 162 and 164, respectively. Curve 162 takes into account a minimum offered lead time of 10 days, and curve 164 takes into account a maximum offered lead time of 40 days. A curve 160 of an order lead time profile may be modified in any other suitable manner to take into account any other suitable feature. For example, order lead time profiles over time may be examined using a waterfall analysis to determine trends. An order lead time profile may be adjusted to fit the trends. As another example, an order lead time profile may be adjusted to provide a more conservative estimate or a less conservative estimate.

Figure 7:
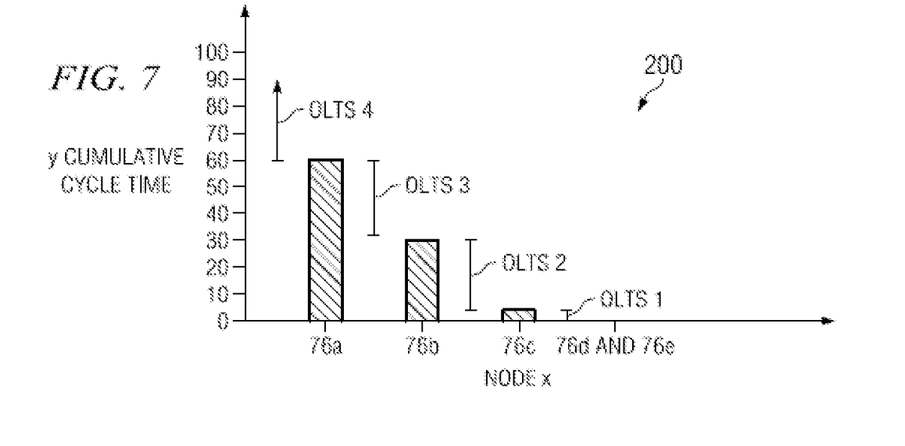
FIG. 7 is a bar graph illustrating example cycle times for nodes of a supply chain.

FIG. 7 is a bar graph 200 illustrating example cycle times for nodes 76 of supply chain 70. Bar graph 200 has a y axis that represents the cumulative cycle time of a node 76, and an x axis that represents the node 76. The cumulative cycle time represents the difference between the time when an item reaches node 76 and the time when the end product is delivered to customer 84. According to bar graph 200, node 76a has a cumulative cycle time of 60 days, node 76b has a cumulative cycle time of 30 days, node 76c has a cumulative time of 3 days, and nodes 76d and 76e each have a cumulative cycle time of 0 days.

The cumulative cycle times may be used to define order lead time segments representing a difference between cumulative cycle times. According to one embodiment, an order lead time segment may represent the difference between cumulative cycle times for successive nodes 76. According to the illustrated embodiment, order lead time segment 1 represents less than or equal to 3 days, order lead time segment 2 represents greater than 3 and less than or equal to 30 days, order lead time segment 3 represents greater than 30 and less than or equal to 60 days, and order lead time segment 4 represents greater than 60 days. Order lead time segments may, however, be defined in any suitable manner.

Figure 8:
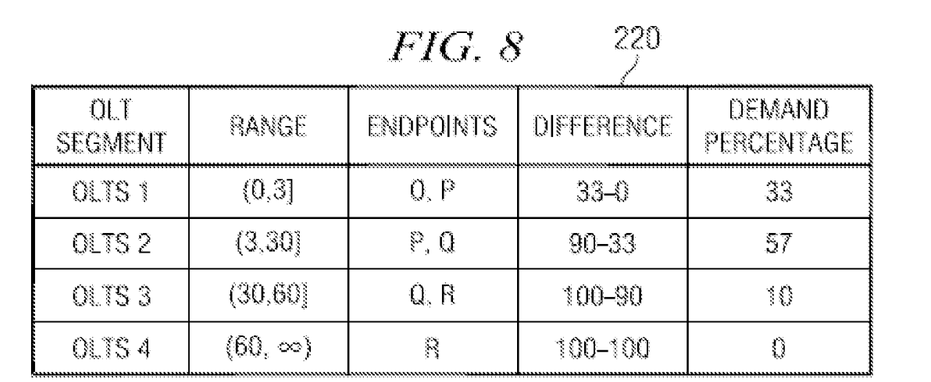
FIG. 8 is a table with example demand percentages.

FIG. 8 is a table 220 with example demand percentages. A demand percentage represents the percentage of the demand that needs to be satisfied during an order lead time segment in order to satisfy an order lead time profile.

According to the illustrated example, table 220 illustrates how to calculate demand percentages for order lead time segments 1 through 4 of FIG. 7 using order lead time profile curve 160 of FIG. 6. Table 220 shows the range of each segment determined as described previously with reference to FIG. 7. The endpoints of each segment correspond to points of curve 160 of FIG. 6. For example, the three day endpoint corresponds to point P, the 30 day endpoint corresponds to point Q, and the 60 day endpoint corresponds to point R.

Each point of curve 160 indicates a cumulative percentage of the demand that corresponds to the number of days. For example, point P indicates that 33% corresponds to 3 days, point Q indicates that 90% corresponds to 30 days, and point R indicates that 100% corresponds to 60 days. The difference in the demand corresponding to the endpoints of the order lead time segment yields the demand percentage. Accordingly, order lead time segment 1 has a demand percentage of 33%–0%=33%, order lead time segment 2 has a demand percentage of 90%–33%=57%, order lead time segment 3 has a demand percentage of 100%–90%=10%, and order lead time segment 4 has a demand difference of 100%–100%=0%.

Figure 9:
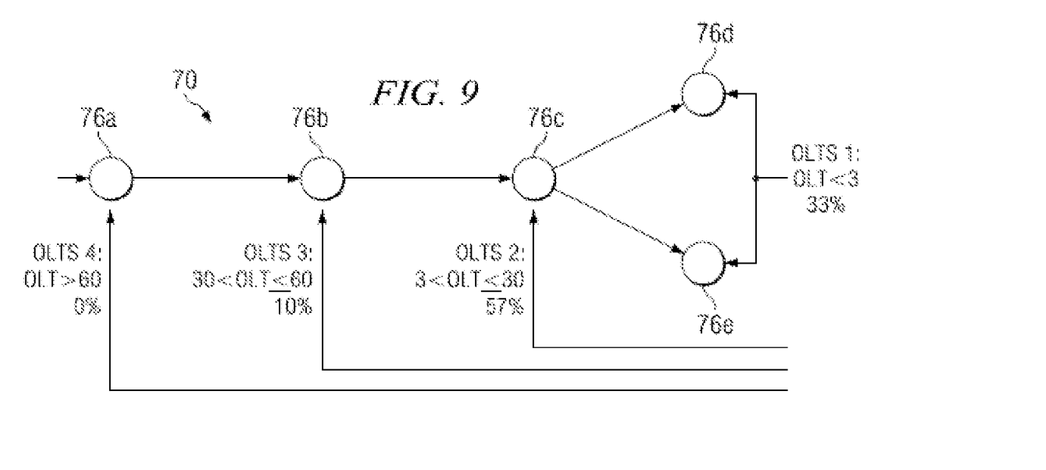
FIG. 9 is a diagram illustrating redistributed demand of an example supply chain.

FIG. 9 is a diagram illustrating an example redistributed demand for an example supply chain 70. According to the illustrated example, the demand may be redistributed according to table 220 of FIG. 8. The demand percentage for OLTS1 is 33%, for OLTS2 is 57%, for OLTS3 is 10%, and for OLTS4 is 0%.

FIGS. 10 through 13 illustrate example procedures of calculating inventory for the nodes 76 of a supply chain 70, given the demand, supply lead times, and customer service level for the nodes 76. If the demand for a supply chain 70 is redistributed to upstream nodes 76, the inventory for the nodes 76 may be calculated for the distributed demand, which may be calculated using the demand percentages of the nodes 76. The inventory for the distributed demand may then be combined with the inventory for customer demand to obtain the total inventory for nodes 76.

Figure 10:
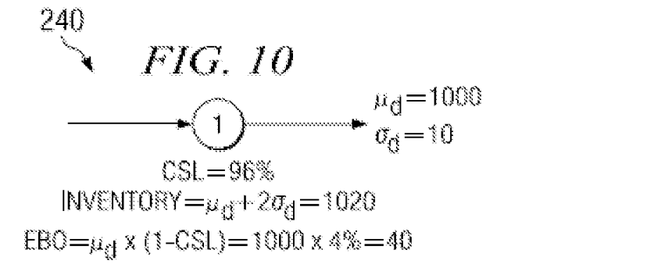
FIG. 10 illustrates an example node for which an inventory may be calculated.

FIG. 10 illustrates an example supply chain portion 240 with a node 76 (node 1) for which an inventory may be calculated. According to one embodiment, the customer service level CSL for node 1 may be expressed according to Equation (1):

$$CSL = 1 - EBO/\mu_d \quad (1)$$

where EBO represents the expected back order of node 1 and $\mu_d$ represents the mean lead time demand. Expected back order represents insufficient inventory of node 76 to meet demand at node 76. The lead time demand describes the demand for a lead time segment. Expected back order EBO may be calculated according to Equation (2):

$$EBO = \int_s^\infty (x - fs)p(x)dx \quad (2)$$

where p(x) represents the probability density function around the mean lead time demand, s represents a reorder point, and f represents a partial fulfillment factor. If partial fills are not allowed, then f=0 and the term drops out. According to one embodiment, the demand distribution may be considered a Normal distribution for relatively fast moving items in terms of demand over lead time, a Gamma distribution for items moving at a relatively intermediate speed in terms of demand over lead time, or a Poisson distribution for relatively slow moving items in terms of demand over lead time. The distribution may be selected by a user or may be a default selection. The mean lead time demand may be calculated according to Equation (3):

$$\mu_d = \int_{-\infty}^\infty xp(x)dx \quad (3)$$

According to one example, for a fixed supply lead time (SLT), the inventory of node 1 may be calculated to propagate demand given the mean lead time demand $\mu_d$ of demand d, the standard deviation of lead time demand $s_d$ of demand d (where standard deviation is used as one example measure of variability), and the customer service level CSL. According to the illustrated example, mean lead time demand $\mu_d$ is 1000 units with a variability $s_d$ of 10 units, and node 1 has a customer service level CSL of 96%. The inventory needed to cover mean lead time demand $\mu_d$ with x customer service level may be calculated as $\mu_d + xs_d$, where x corresponds to y according to standard confidence levels. For example, node 1 needs $\mu_d + 2s_d$ to cover the demand 96% of the time. In the illustrated example, the inventory needed at node 1 is $\mu_d + 2s_d = 1020$ units. To satisfy the remaining demand, there is an expected back order EBO=$\mu_d \times (1-CSL)$. In the illustrated example, the expected back order EBO=$\mu_d \times (1-CSL)$=40 units. Inventory may be calculated for a number m of time periods by multiplying the inventory units by m.

According to one embodiment, demand may be propagated to determine the mean lead time demand and variability at each node 76. Then, inventory may be calculated at individual nodes 76 using known techniques, which may simplify inventory optimization. In other words, a complicated multi-echelon supply chain problem may be reduced to a series of simpler single echelon supply chain problems.

Figure 11:
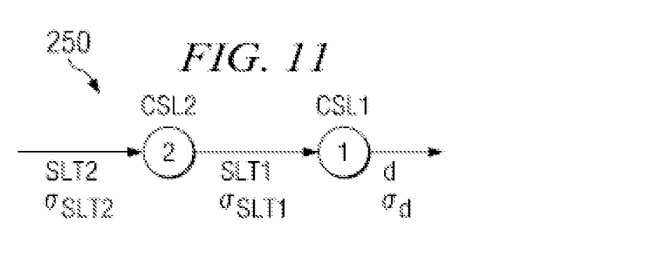
FIG. 11 illustrates an example supply chain that includes one node supplying another node.

FIG. 11 illustrates an example supply chain portion 250 that includes one node 76 (node 1) supplying another node 76 (node 2). According to the illustrated embodiment, node 1 has a demand d over the lead time with a demand variability of $s_d$. Node 1 has a customer service level CSL1 and a supply lead time SLT1 with a supply lead time variability of $s_{SLT1}$, and node 2 has a customer service level CSL2 and a supply lead time SLT2 with a supply lead time variability of $s_{SLT2}$.

According to one embodiment, the supply lead time for node 1 may be calculated according to Equation (4):

$$CSL2 * SLT1 + (1-CSL2) * (SLT1+SLT2) \quad (4)$$

and the supply lead time variability may be calculated according to Equation (5):

$$CSL2 * s_{SLT1} + (1-CSL2) * (s_{SLT1} + s_{SLT2}) \quad (5)$$

Figure 12:
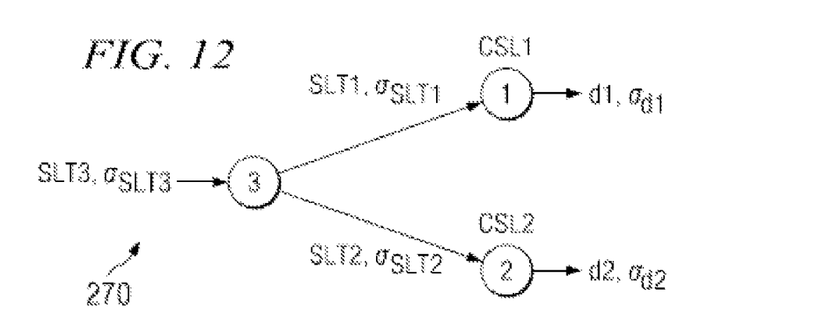
FIG. 12 illustrates an example supply chain that includes one node supplying two nodes.

FIG. 12 illustrates an example supply chain portion 270 that includes one node 76 (node 3) supplying two nodes 76 (nodes 1 and 2). Node 1 has a demand d1 with a demand variability of $s_{d1}$ and a customer service level CSL1. Node 2 has a demand d2 with a demand variability of $s_{d2}$ and a customer service level CSL2. Node 1 has a supply lead time SLT1 with a supply lead time variability $s_{SLT1}$, and node 2 has a supply lead time SLT2 with a supply lead time variability $s_{SLT2}$. Node 3 has a supply lead time SLT3 with a supply lead time variability of $s_{SLT3}$.

According to one embodiment, supply chain portion 270 represents a single distribution center that supports multiple distribution centers or a single intermediate item that makes multiple end-products. The demand at node 3 may be given by d1+d2 with a demand variability given by Equation (6):

$$\sqrt{s_{d1}^2 + s_{d2}^2 + cov(s_{d1}, s_{d2})} \quad (6)$$

In a simple case, the covariance may be assumed to equal zero. The supply lead time and supply lead time variability of node 1 may be calculated according to Equations (4) and (5), respectively. According to another embodiment, supply chain portion 270 may represent a node 76 with multiple demand streams. According to this embodiment, supply chain portion 270 may represent multiple demand streams if supply lead time SLT1=0, supply lead time variability $s_{SLT1}$=0, supply lead time SLT2=0, and supply lead time variable $s_{SLT2}$=0. According to one embodiment, demand of nodes 1 and 2 may be aggregated at node 3. The demand of nodes 1 and 2 may be pooled in order to calculate the demand of node 3.

Figure 13:
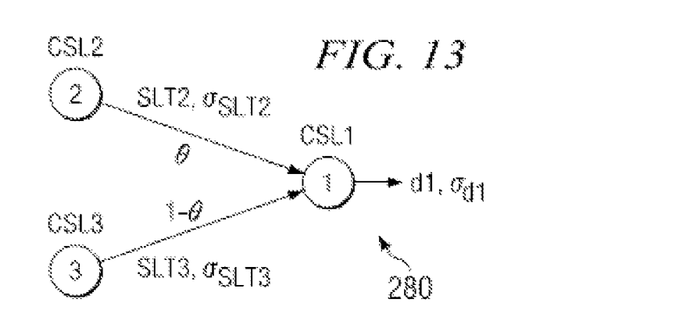
FIG. 13 illustrates an example supply chain that includes two nodes supplying one node.

FIG. 13 illustrates an example supply chain portion 280 that includes two nodes 76 (nodes 2 and 3) supplying one node 76 (node 1). Node 1 has a customer service level CSL1 and a demand d1 with a demand variability $S_{d1}$. Node 2 has a customer service level CSL2 and node 3 has a customer service level CSL3. Node 1 has a supply lead time SLT2 with a supply lead time variability $s_{SLT2}$ from node 2, and a supply lead time SLT3 with a supply lead time variability $s_{SLT3}$ from node 3.

According to one embodiment, supply chain portion 280 may represent product substitutions, alternative components, or alternate distribution routes. According to the embodiment, supply chain portion 280 represents node 1 receiving supplies from alternate sources nodes 2 and 3. Node 1 receives a portion?, where 0=?=1, from node 2 and a portion 1−? from node 3. According to this embodiment, the lead time for node 1 may be given by Equation (7):

$$?*SLT1+(1-?)*SLT3 \quad (7)$$

with a lead time variability given by Equation (8):

$$?*s_{SLT1}+(1-?)*s_{SLT2} \quad (8)$$

According to another embodiment, supply chain portion 280 may represent node 1 requiring supplies from both nodes 2 and 3 to create or assemble a product. According to this embodiment, this representation of portion ? is not used since node 1 requires items from both nodes 2 and 3. According to the embodiment, the lead time at node 1 may be given by Equation (9):

$$Max(SLT2,SLT3) \quad (9)$$

with a lead time variability given by Equation (10):

$$\frac{1}{3}[Max(SLT2+xs_{SLT2}, SLT3+xs_{SLT3})-Max(SLT2, SLT3)]$$

where x may be determined according to standard confidence levels. For example, x=3 for a 99% confidence level.

To summarize, FIGS. 10 through 13 illustrate example procedures for calculating inventory for the nodes 76 of a supply chain 70. The inventory may be calculated given the demand, supply lead times, and customer service level for the node 76. If the demand for a supply chain 70 is redistributed to upstream node 76, the inventory for the nodes 76 may be calculated for the redistributed demand, which may be calculated using the demand percentages of the nodes 76. Inventory needed to satisfy the redistributed demand may be combined with inventory needed without regard to the redistributed demand in order to determine the total demand needed at a node 76.

Certain embodiments of the invention may provide one or more technical advantages. For example, demand may be redistributed from an ending node to upstream nodes of a supply chain according to a probability distribution of order lead time. Redistributing the demand to upstream nodes may allow for optimizing inventory at individual nodes, which may simplify the optimization. Inventory for the supply chain may be optimized for the redistributed demand. Optimizing inventory for redistributed demand may decrease the need to stock inventory at downstream nodes, which may minimize cost. Inventory may be optimized with respect to a probability distribution of order lead time for a customer. Taking into account the order lead time may improve continued performance, which may lead to increased market share.

Although an embodiment of the invention and its advantages are described in detail, a person skilled in the art could make various alterations, additions, and omissions without departing from the spirit and scope of the present invention as defined by the appended claims.

What is claimed is:

1. A method of optimizing inventory, comprising:
generating, using a computer, one or more end node demand streams in a supply chain, each end node demand stream comprising a time series of demands at an end node in the supply chain forecasted over one or more time periods;
organizing, using the computer, one or more order lead time groups that characterize an order lead time of each of the one or more end node demand streams;
calculating, using the computer, an order lead time probability distribution for each order lead time group;
retrieving, using the computer, a supply path in the supply chain for the end node of each end node demand stream;
calculating, using the computer, a cumulative supply lead time for each inventory-carrying node upstream from the end node in the supply path of each end node demand stream;
dividing, using the computer, the order lead time probability distribution of each order lead time group into order lead time segments corresponding to each supply lead time, each order lead time segment representing a portion of the supply chain that allows for distribution of order lead times and demand upstream in the supply chain;
redistributing, using the computer, demand to at least one of the order lead time segments upstream in the supply chain for each of the one or more end node demand streams; and
calculating, by the computer, inventory targets at each inventory-carrying node in the supply chain.

2. The method of claim 1, further comprising identifying, by the computer, each end node demand stream by one or more of a unique combination of product being sold, a location from where product is being shipped, customer, and customer location.

3. The method of claim 2, wherein organizing the one or more order lead time groups comprises categorizing one or more order lead time groups according to features that affect the order lead time of customers, products or locations.

4. The method of claim 3, further comprising identifying the features that affect the order lead time with a lead time history.

5. The method of claim 1, further comprising calculating, using the computer, a specified confidence level from each upstream inventory-carrying node for each supply path.

6. The method of claim 1, further comprising establishing the order lead time segments with one or more cycle times, each cycle time representing a difference in time between when an item arrives and a node in the supply and chain and leaves the node in the supply chain.

7. The method of claim 1, further comprising:
determining an order lead time profile by identifying the one or more lead time groups;
selecting the order lead time profile that corresponds to the one or more lead time groups identified; and
modifying the order lead time profile.

8. The method of claim 7, further comprising calculating a demand percentage split for each order lead time segment.

9. The method of claim 8, further comprising postponing safety stock inventory to one or more nodes upstream from the end node in the supply chain.

10. The method of claim 9, wherein redistributing demand to the at least one of the order lead time segments comprises redistributing the demand to the at least one of the order lead time segments by estimating a demand percentage for each order lead time segment, the demand percentage comprising a percentage of demand required to be satisfied during the order lead time segment in order to satisfy customer demand within constraints of the order lead time profile.

11. The method of claim 10, further comprising calculating, using the computer, inventory required at the end node to satisfy the demand percentage.

12. The method of claim 11, further comprising generating, using the computer, a demand for any node upstream from the end node.

13. A system of optimizing inventory, comprising:
a database configured to store one or more end node demand streams in a supply chain, each end node demand stream comprising a time series of demands at an end node in the supply chain forecasted over one or more time periods;
a computer system coupled with the database and configured to:
organize one or more order lead time groups that characterize an order lead time of each of the one or more end node demand streams;
calculate an order lead time probability distribution for each order lead time group;
retrieve a supply path in the supply chain for the end node of each end node demand stream;
calculate a cumulative supply lead time for each inventory-carrying node upstream from the end node in the supply path of each end node demand stream;
divide the order lead time probability distribution of each order lead time group into order lead time segments corresponding to each supply lead time, each order lead time segment representing a portion of the supply chain that allows for distribution of order lead times and demand upstream in the supply chain;
redistribute demand to at least one of the order lead time segments upstream in the supply chain for each of the one or more end node demand streams; and
calculate inventory targets at each inventory-carrying node in the supply chain.

14. The system of claim 13, wherein the computer system is further configured to identify each end node demand stream by one or more of a unique combination of product being sold, a location from where product is being shipped, customer, and customer location.

15. The system of claim 14, wherein organize the one or more order lead time groups comprises categorize one or more order lead time groups according to features that affect the order lead time of customers, products or locations.

16. The system of claim 15, wherein the computer system is further configured to identify the features that affect the order lead time with a lead time history.

17. The system of claim 13, wherein the computer system is further configured to calculate a specified confidence level from each upstream inventory-carrying node for each supply path.

18. The system of claim 13, wherein the computer system is further configured to establish the order lead time segments with one or more cycle times, each cycle time comprising a difference in time between when an item arrives and a node in the supply and chain and leaves the node in the supply chain.

19. The system of claim 13, wherein the computer system is further configured to:
determine an order lead time profile by identifying the one or more lead time groups;
select the order lead time profile that corresponds to the one or more lead time groups identified; and
modify the order lead time profile.

20. The system of claim 19, wherein the computer system is further configured to calculate a demand percentage split for each order lead time segment.

21. The system of claim 20, wherein the computer system is further configured to postpone safety stock inventory to one or more nodes upstream from the end node in the supply chain.

22. The system of claim 21, wherein redistribute demand to the at least one of the order lead time segments comprises redistribute the demand to the at least one of the order lead time segments by estimating a demand percentage for each order lead time segment, the demand percentage comprising a percentage of demand required to be satisfied during the order lead time segment in order to satisfy customer demand within constraints of the order lead time profile.

23. The system of claim 22, wherein the computer system is further configured to calculate inventory required at the end node to satisfy the demand percentage.

24. The system of claim 23, wherein the computer system is further configured to generate a demand for any node upstream from the end node.

25. A non-transitory computer-readable medium embodied with software for optimizing inventory, the software when executed using a computer is configured to:
generate one or more end node demand streams in a supply chain, each end node demand stream comprising a time series of demands at an end node in the supply chain forecasted over one or more time periods;
organize one or more order lead time groups that characterize an order lead time of each of the one or more end node demand streams;
calculate an order lead time probability distribution for each order lead time group;
retrieve a supply path in the supply chain for the end node of each end node demand stream;
calculate a cumulative supply lead time for each inventory-carrying node upstream from the end node in the supply path of each end node demand stream;
divide the order lead time probability distribution of each order lead time group into order lead time segments corresponding to each supply lead time, each order lead time segment representing a portion of the supply chain that allows for distribution of order lead times and demand upstream in the supply chain;

redistribute demand to at least one of the order lead time segments upstream in the supply chain for each of the one or more end node demand streams; and calculate inventory targets at each inventory-carrying node in the supply chain.

26. The computer-readable medium of claim 25, wherein the software is further configured to identify each end node demand stream by one or more of a unique combination of product being sold, a location from where product is being shipped, customer, and customer location.

27. The computer-readable medium of claim 26, wherein organize the one or more order lead time groups comprises categorize one or more order lead time groups according to features that affect the order lead time of customers, products, or locations.

28. The computer-readable medium of claim 27, wherein the software is further configured to identify the features that affect the order lead time with a lead time history.

29. The computer-readable medium of claim 25, wherein the software is further configured to calculate a specified confidence level from each upstream inventory-carrying node for each supply path.

30. The computer-readable medium of claim 25, wherein the software is further configured to establish the order lead time segments with one or more cycle times, each cycle time comprising a difference in time between when an item arrives and a node in the supply and chain and leaves the node in the supply chain.

31. The computer-readable medium of claim 25, wherein the software is further configured to:

determine an order lead time profile by identifying the one or more lead time groups;

select the order lead time profile that corresponds to the one or more lead time groups identified; and modify the order lead time profile.

32. The computer-readable medium of claim 31, wherein the software is further configured to calculate a demand percentage split for each order lead time segment.

33. The computer-readable medium of claim 32, wherein the software is further configured to postpone safety stock inventory to one or more nodes upstream from the end node in the supply chain.

34. The computer-readable medium of claim 33, wherein redistribute demand to the at least one of the order lead time segments comprises redistribute the demand to the at least one of the order lead time segments by estimating a demand percentage for each order lead time segment, the demand percentage comprising a percentage of demand required to be satisfied during the order lead time segment in order to satisfy customer demand within constraints of the order lead time profile.

35. The computer-readable medium of claim 34, wherein the software is further configured to calculate inventory required at the end node to satisfy the demand percentage.

36. The computer-readable medium of claim 35, wherein the software is further configured to generate a demand for any node upstream from the end node.

* * * * *